US006951139B2

United States Patent
Reuter et al.

(10) Patent No.: US 6,951,139 B2
(45) Date of Patent: Oct. 4, 2005

(54) TIRE SENSOR AND METHOD OF ASSEMBLY

(75) Inventors: Rene Francois Reuter, Burden (LU); Claude Ernest Félix Boes, Erpeldange (LU); Peter Phelps Roch, Ettelbruck (LU); Rene Jean Zimmer, Howald (LU); Damian Georges, Bereldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 25 days.

(21) Appl. No.: 10/729,600

(22) Filed: Dec. 5, 2003

(65) Prior Publication Data

US 2005/0120801 A1 Jun. 9, 2005

(51) Int. Cl.[7] ................................................ G01B 7/16
(52) U.S. Cl. ....................................................... 73/780
(58) Field of Search ........................... 72/862.041, 780, 72/862.68, 862.042, 862.043, 862.044, 862.045

(56) References Cited

U.S. PATENT DOCUMENTS

| | | | |
|---|---|---|---|
| 4,168,518 A | | 9/1979 | Lee et al. ................... 361/283 |
| 4,430,690 A | * | 2/1984 | Chance et al. ........... 361/321.3 |
| 4,458,292 A | | 7/1984 | Tward et al. ............... 361/283 |
| 5,027,076 A | * | 6/1991 | Horsley et al. ............. 324/674 |
| 5,075,624 A | * | 12/1991 | Bezjak ....................... 324/318 |
| 5,610,335 A | * | 3/1997 | Shaw et al. ............... 73/514.36 |
| 6,026,694 A | | 2/2000 | Gray ........................ 73/862.68 |
| 6,538,458 B2 | * | 3/2003 | Togashi et al. ............. 324/662 |

* cited by examiner

Primary Examiner—Max Noori
(74) Attorney, Agent, or Firm—Richard B. O'Plancik

(57) ABSTRACT

A stress sensor includes two capacitor plates held in a spaced-apart relationship by a connector block situated therebetween. The connector block includes a plurality of rods protruding from opposite connector block sides and extending into a respective capacitor plate to attach peripheral portions of each capacitor plate to the connector block. A small air gap is maintained between peripheral portions of the capacitor plates by the inclusion of a spacer member. Terminal end portions of the protruding rods are deformed such as by the application of heat over an outer surface of the capacitor plates to retain the capacitor plates in a fixed mutual relationship. The terminal end portions of the rods further serve to prevent horizontal or vertical slippage between the capacitor plates when the sensor is vulcanized into rubber compounds such as in a tire. Once embedded within the rubber compound, the gap between the capacitor plates varies responsively to stress within the rubber compound whereby varying proportionately the capacitance of the device. A signal is directed into the sensor device and an antenna positioned proximate to the device detects the capacitance value between the capacitor plates. As the capacitance varies proportionately with stress within the material, the antenna detects the changes and transmits data to a remote reader that interprets the data to ascertain measured stress within the rubber compound.

16 Claims, 3 Drawing Sheets

TIRE SENSOR AND METHOD OF ASSEMBLY

FIELD OF THE INVENTION

The present invention relates generally to stress sensors for measuring stress forces within a rubber compound and, more specifically, to a stress sensor and method of assembly for measuring stress forces present within a tire rubber compound.

BACKGROUND OF THE INVENTION

Capacitor sensors for measuring stress forces within materials are generally well known. Such sensors comprise metallic plates typically formed of a suitable material such as brass. The metallic plates are spaced apart by an air gap and are retained at a predisposed relationship. The metallic plates deflect responsive to stress force within a material and the air gap between the plates varies accordingly. As the air gap varies, the capacitance between the capacitor plates also varies. A signal is directed into the device from a remote source and the capacitance between the metallic sheets is detected by a remote antenna and reader to measure the level of stress force within the material.

While such capacitor sensors work well and have been well accepted in the industry, several shortcomings in their manufacture and use remain. Existing capacitor stress sensors are relatively complicated to manufacture and assemble, resulting in a greater than optimal cost to the end user. In addition, existing sensors are prone to misalignment resulting in measurement inaccuracy. Still further, existing sensors tend to be susceptible to horizontal and vertical slippage between the capacitor plates when vulcanized into rubber compounds such as a tire. Such slippage distorts the configuration of the sensor and may dislocate the sensor from its optimal, intended location within the material, resulting in a potential for measurement error.

SUMMARY OF THE INVENTION

According to one aspect of the invention, a sensor for measuring stress forces within a material such as a tire compound is assembled to include first and second capacitor plates spaced apart by a variably dimensioned air gap. A connector block formed unitarily from a thermoplastic material such as Nylon is situated between the capacitor plates and holds the capacitor plates together in a predetermined mutual orientation. The connector block includes a plurality of rod members protruding from opposite connector block sides and extending into a respective capacitor plate to attach peripheral portions of each capacitor plate to the connector block. The peripheral portions of the capacitor plates may be stepped to accommodate assembly to the connector block.

According to another aspect of the invention, a spacer member is situated between the capacitor plates, the spacer member including opposite spacer member sides held against a respective inward facing surface of the capacitor plates along peripheral portions of the air gap whereby the air gap is calibrated along the peripheral portions to the thickness of the spacer member. The spacer member may be formed from a plastic resin such as MYLAR in order to maintain a tight thickness tolerance whereby the air gap spacing between the capacitor plates can be controlled to a desired precision. MYLAR is a trademark of Du Pont de Nemours Corporation.

Pursuant to yet a further aspect of the invention, the connector block rod members are formed to extend axially through the capacitor plates to an outer plate side and include terminal rod portions formed at an angle over the capacitor plate along the capacitor plate outer side. The terminal ends of the rods thus serve to hold the sensor assembly together and further act to resist any sensor misalignment from horizontal or vertical slippage as the sensor is vulcanized into a tire rubber compound.

A further aspect of the invention includes a method of assembling the sensor and comprises the steps: forming a plurality of through-holes through peripheral portions of each capacitor plate; positioning a connector block between the capacitor plates, the connector block including a plurality of rod members protruding from opposite connector block sides; extending the rod members through respective through-holes in the capacitor plates to attach the peripheral portions of each capacitor plate to the connector block; and forming terminal rod portions of the rod members over an outer side of a respective capacitor plate. The method may further include the steps: forming the connector block of heat deformable plastics material; extending the terminal portions of the connector rod members a distance beyond the outer side of a respective capacitor plate; and applying heat to the terminal portions of the connector rod members while deforming the terminal portions over the outer side of the respective capacitor plate.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
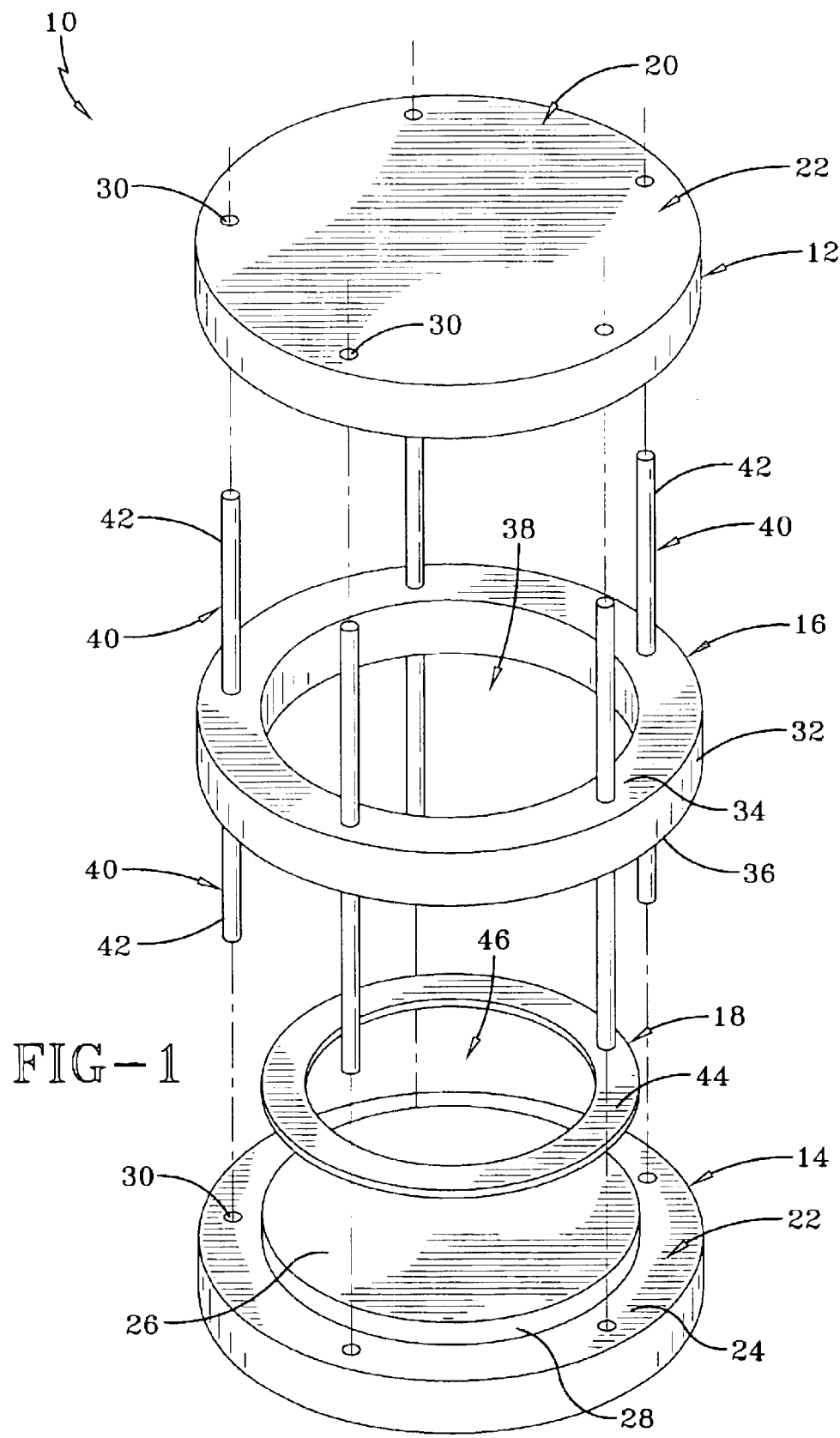
FIG. 1 is an exploded perspective view of the subject sensor.
Figure 2:
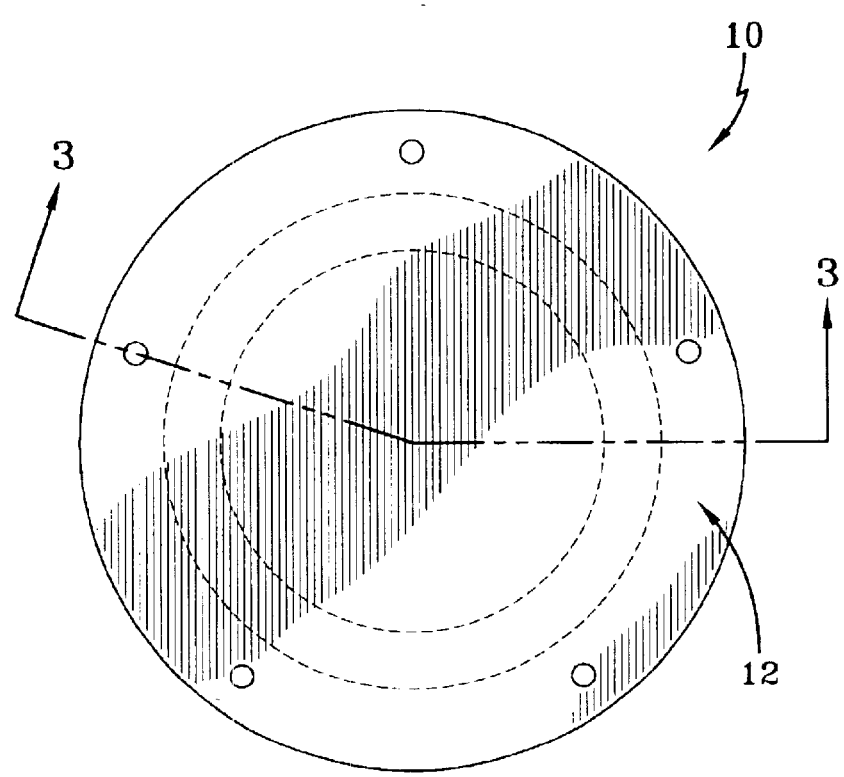
FIG. 2 is a top plan view thereof.
Figure 3:
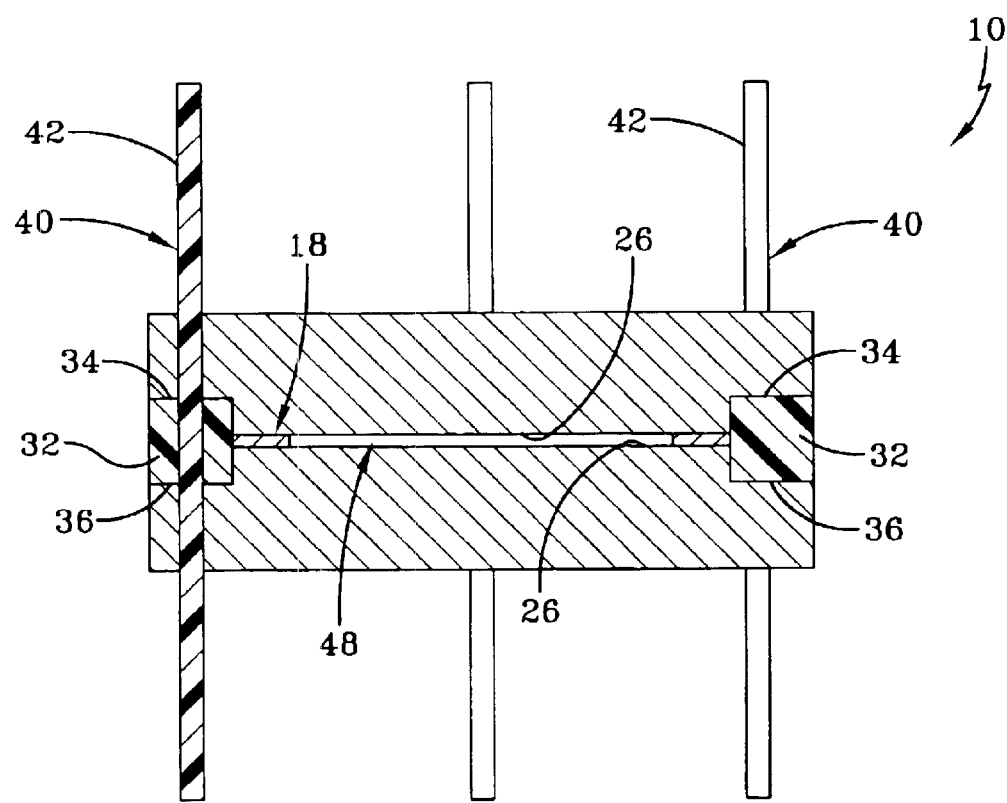
FIG. 3 is a transverse sectional view thereof taken along the line 2—2 of FIG. 2.

Referring initially to FIGS. 1–3, the subject sensor 10 is of a general type commonly referred to as capacitor sensors. Such sensors are used for a myriad of applications. For example, the sensors may be embedded in a material and used to monitor stress forces acting within the material. A particular application in which such sensors find utility is in the measurement of stresses within a tire rubber compound. One or more of the sensors may be incorporated into the rubber compound of a tire prior to tire vulcanization. The sensors monitor the tire and provide data that may be used to analyze the stress profile of the tire during its manufacture and use.

Because the process of vulcanization imparts stresses on the sensor within a tire, sensors in such applications have been known to experience horizontal or vertical slippage during the vulcanization process. Such consequences are undesirable and can result in sensor failure or defects in sensor readings.

With regard to FIGS. 1–3, the sensor 10 will be seen to comprise first and second capacitor plates 12, 14 having a connector block 16 generally disposed therebetween. The plates 12, 14 are of metallic composition and may be fabricated from various known metals or metal alloys such as brass. Metal wires (not shown) having copper or brass surfaces may be soldered to the plates 12, 14 in conventional manner. The plates 12, 14 are shown in a preferred form to be circular, however, other shapes and configurations may be employed if so desired.

The connector block 16 is preferably formed as a unitary body of electrically insulating material such as nylon. The block 16 may be efficiently made by means of conventional processes such as injection molding. In the preferred form, block 16 is circular and has a general external geometry and dimension that complements the configuration of plates 12, 14. Shapes other than circular may be employed if desired, however.

A spacer ring 18 is also provided for incorporation into the assembly 10. The spacer ring 18 is formed of any suitable material such as plastic by conventional means such as injection molding, or cut out from a film having the desired gauge. One suitable preferred material for ring 18 is MYLAR. As shown, each plate 12, 14 is of similar configuration, having a planar outward facing surface 20 and a peripheral edge portion designated generally at 22. The peripheral plate portion 22 includes an inward facing peripheral surface 24 that extends inwardly to an elevated central surface 26 by means of step 28. A plurality of through-holes 30 is disposed within and preferably at equidistant spacing about peripheral plate portion 22. The number and location of through-holes may be varied from that illustrated if desired.

Continuing with reference to FIGS. 1–3, as discussed previously, the connector block 16 preferably comprises a unitarily formed ring-shaped body 32 formed from a thermoplastic material such as nylon. The ring-shaped body 32 includes oppositely facing sides 34, 36 and is dimensioned having generally the same radius of curvature as plates 12, 14. A central aperture 38 is disposed within body 32 and a plurality of connector rod members 40 extend from the sides 34, 36 at a spacing complementary with the spacing of apertures 30 through plates 12, 14. The rod members 40 are elongate and preferably straight and symmetrical about a longitudinal axis. Integral to each rod member 40 is a remote terminal end portion 42.

The spacer ring 18 includes a preferably unitary spacer body 44 composed of any suitable material such as plastic resin. MYLAR is one such acceptable material. The ring 18 has a radius of curvature smaller than that of the connector block 16 and plates 12, 14. While preferred, the circular configuration of blocks 1, 18 and plates 12, 14 may be varied without departing from the invention. The spacer body 44 is dimensioned to fit over and closely encircle the raised central surface 26 of each plate adjacent each plate's step 28.

Assembly of the subject sensor 10 proceeds as follows. The individual components 12, 14, 16, and 18 are fabricated as described above. The connector block 16 is disposed between the capacitor plates 12, 14. The two brass sheets or plates 12, 14 attach to the opposite sides 34, 36 of connector block 16 as the through-holes 30 of plates 12,14 are slipped over the connector rod members 40. Through-holes 30 are dimensioned and spaced for close receipt of the rod members 40 therethrough. As the plates 12, 14 are brought against the connector block 16, the spacer ring 18 is sandwiched between the elevated central surfaces 26 of plates and encircles the perimeter of plate surfaces 26.

As will be appreciated from the sectional view of FIG. 3, the stepped inner profile of the capacitor plates 12, 14 compliments the external shape and dimension of the connector block 16 such that an air gap 48 is defined between plate central surfaces 26 of plates 12, 14 as the plates are brought into final abutment against the connector block. The brass plates 12, 14 are designed in section to have a two-step profile such that when brought together against connector block 16, air gap 48 results. The air gap 48 is generally rectangular in profile and extends across the central opening 38 of the connector block 16. Manufacturing the components 12, 14, and 16 to close tolerances ensures that the air gap 48 will be defined to a desired width. A nominal reference capacitance between plates 12, 14 can thus be established.

The small air gap 48, preferentially in the range of 1–50 micrometers, may further be controlled by the presence of spacer ring 18. While not essential to the control of air gap 48, the presence of spacer ring 18 allows for greater control over the width of the gap. Spacer ring is preferentially formed of a hard plastic such as MYLAR and may be formed to tight dimensional tolerances by conventional molding techniques such as injection molding, blown film or calendered film. Location of the ring 18 around peripheral portions of the air gap 48 in abutment with surfaces 26 of plates 12, 14, ensures that the peripheral portions of air gap 48 will be calibrated to the thickness of the spacer ring 18.

Figure 4:
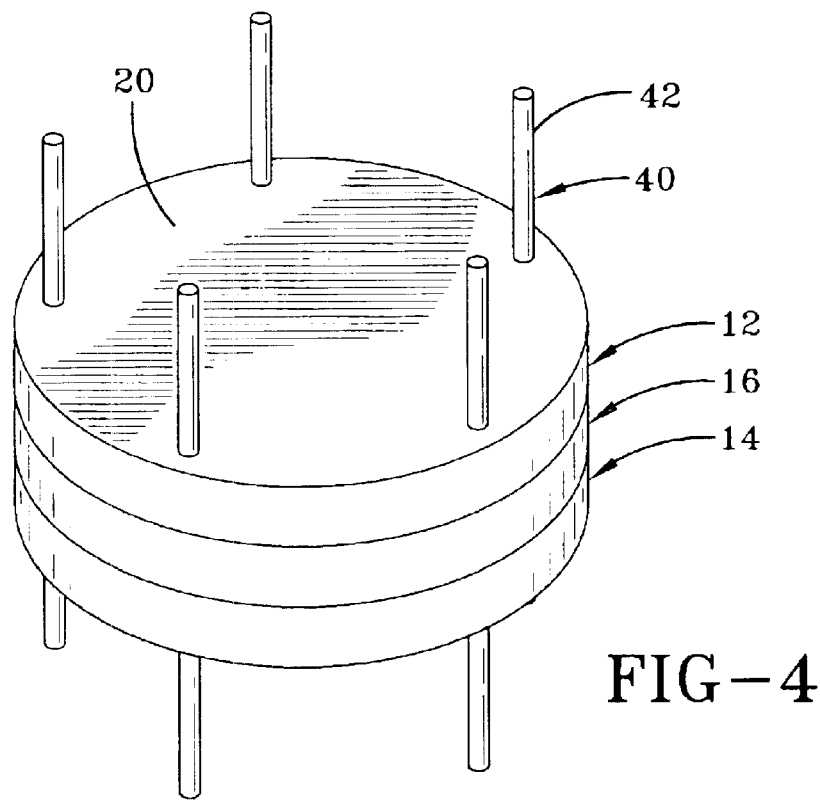
FIG. 4 is a top perspective view of a partially assembled sensor shown prior to the step of deforming rod member ends downward.

FIG. 4 illustrates the sensor at a partially assembled state with plates 12, 14 positioned against opposite sides of connector block 16 and rod members 40 extending through the plates 12, 14. Thereafter, the terminal portions 42 of rods 40 are melted by the application of heated die (not shown) to extend along the top surface 20 of each plate at substantially a right angle. The angle of deformation of rod portions 42, while preferentially ninety degrees, may be varied if desired. Once cooled, the deformed portions 42 of rods 40 fixes the brass plates 12, 14 into their intended mutual position against the connector block 16 and avoids any horizontal or vertical slippage of the plates relative to the connector block that might otherwise occur. The avoidance of slippage is particularly important should the sensor be subsequently vulcanized into a tire rubber compound.

Figure 5:
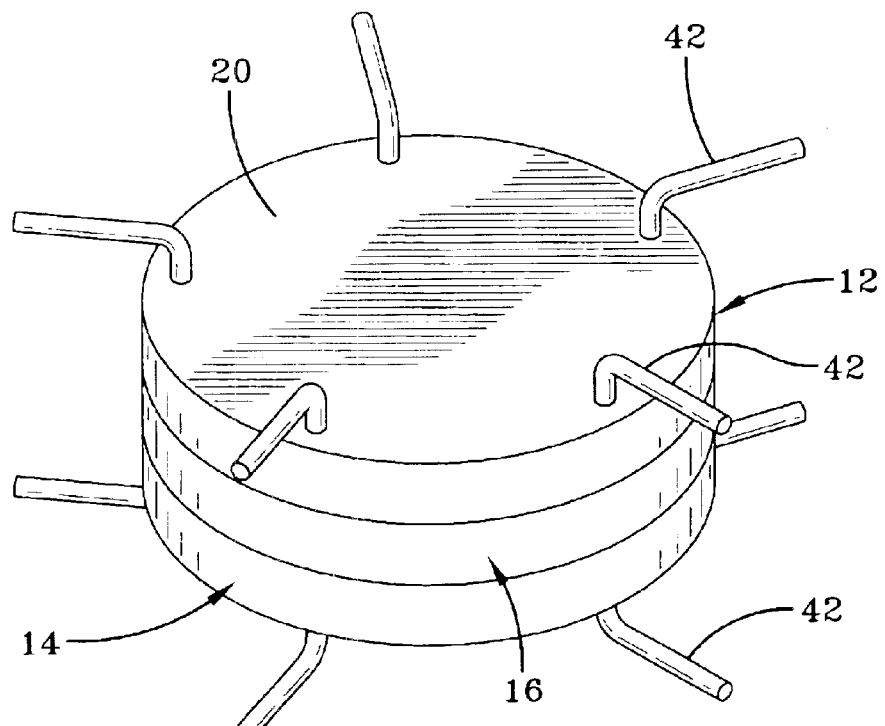
FIG. 5 is a top perspective view of the finished assembled sensor.

One or more of the completed sensor assemblies as shown in FIG. 5 may be incorporated into a material monitor stress forces within the material. The composition of plates 12, 14 is selected so that metal wires (not shown) may be attached to the plate outer surfaces 20 by soldering or other known techniques. The device 10 may thus be connected to other mechanical devices or electronic circuitry (not shown) of conventional form. Alternatively, a signal may be induced into the sensor plates 12, 14. An antenna (not shown) may be positioned to pick up variations to the induced signal resulting from capacitance changes in the device.

Located within a rubber compound, the air gap 48 will vary in thickness as plates 12, 14 flex inward under the influence of stress forces. The capacitance of device 10 will accordingly change in proportion to the applied stress force. The change in capacitance may be monitored by associate circuits connected to device 10 and the level of stress within the material deduced from changes in capacitance levels.

From the foregoing, it will be appreciated that the subject invention satisfies the needs of the industry for a stress sensor that is readily and economically fabricated, assembled and deployed. The sensor 10 may be made in various shapes including the circular form shown in the preferred embodiment. The deformation of rods 40 is an economical means to attach the sensor components together and to maintain their preferred mutual orientation against vertical and horizontal slippage. The use of a heat deformable material in the construction of connector block 16 facilitates the bending of rod portions 42.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A sensor for detecting stress within a material of the type comprising first and second capacitor plates spaced apart by a variably dimensioned air gap, the improvement comprising:
    a connector block situated between the capacitor plates and holding the capacitor plates together in a predetermined mutual orientation, the connector block including a plurality of rod members protruding from opposite connector block sides and extending into a respective capacitor plate to attach peripheral portions of each capacitor plate to the connector block; and
    a spacer member situated between the capacitor plates, the spacer member including opposite spacer member sides held against a respective inward facing surface of the capacitor plates along peripheral portions of the air gap whereby the air gap is calibrated along the peripheral portions to the thickness of the spacer member.

2. A sensor according to claim 1, wherein the spacer member is composed of MYLAR.

3. A sensor for detecting stress within a material of the type comprising first and second capacitor plates spaced apart by a variably dimensioned air gap, the improvement comprising:
    a connector block situated between the capacitor plates and holding the capacitor plates together in a predetermined mutual orientation, the connector block including a plurality of rod members protruding from opposite connector block sides and extending into a respective capacitor plate to attach peripheral portions of each capacitor plate to the connector block; and
    wherein the connector block rod members extend axially through the capacitor plates to an outer plate side and include terminal rod portions formed at an angle over the capacitor plate along the capacitor plate outer side.

4. A sensor according to claim 3, wherein each respective terminal rod portion of a rod member extends at approximately a ninety degree angle to a longitudinal axis of the rod member.

5. A sensor according to claim 4, wherein the connector block rod members are composed of a heat deformable plastics material.

6. A sensor for detecting stress within a material of the type comprising first and second capacitor plates spaced apart by a variably dimensioned air gap, the improvement comprising:
    a connector block situated between the capacitor plates and holding the capacitor plates together in a predetermined mutual orientation, the connector block including a plurality of rod members protruding from opposite connector block sides and extending into a respective capacitor plate to attach peripheral portions of each capacitor plate to the connector block; and
    wherein the connector block is unitarily formed and composed of a heat deformable plastics material.

7. A sensor for detecting stress within a material of the type comprising first and second capacitor plates spaced apart by a variably dimensioned air gap, the improvement comprising:
    a connector block situated between the capacitor plates and holding the capacitor plates together in a predetermined mutual orientation, the connector block including a plurality of rod members protruding from opposite connector block sides and extending into a respective capacitor plate to attach peripheral portions of each capacitor plate to the connector block;
    the connector block is disposed between peripheral portions of the capacitor plates and the connector block rods extend into the peripheral capacitor plate portions to attach the peripheral plate portions to the connector block; and
    wherein the capacitor plates are substantially circular and the connector block comprises a unitarily formed circular ring disposed between the peripheral portions of the capacitor plates.

8. A sensor according to claim 7, wherein further comprising a spacer ring member situated between the capacitor plates concentrically inward of the connector block, the spacer member including opposite spacer member sides held against a respective inward facing surface of the capacitor plates along peripheral portions of the air gap whereby the air gap is calibrated along the peripheral portions to the thickness of the spacer member.

9. A sensor according to claim 8, wherein the connector block rod members extend axially through the capacitor plates to an outer plate side and include terminal rod portions formed at an angle over the capacitor plate along the capacitor plate outer side.

10. A sensor according to claim 9, wherein the connector block is composed of a heat deformable thermoplastic material.

11. A tire and sensor assembly for detecting stress within a tire rubber material, comprising:
    a tire having a target region at least partially composed of rubber;
    a sensor embedded within the target region and comprising: first and second capacitor plates spaced apart by a variably dimensioned air gap; a connector block situated between the capacitor plates and holding the capacitor plates together in a predetermined mutual orientation, the connector block including a plurality of rod members protruding from opposite connector block sides and extending into a respective capacitor plate to attach peripheral portions of each capacitor plate to the connector block; and
    the connector block rod members extend axially through the capacitor plates to an outer plate side and include terminal rod portions formed to extend over the capacitor plate along the capacitor plate outer side.

12. An assembly as set forth in claim 11, wherein the terminal rod portion of a rod member extends at approximately a ninety-degree angle to a longitudinal axis of the rod member.

13. An assembly as set forth in claim 12, wherein the connector block rod members are composed of a heat deformable plastics material.

14. An assembly as set forth in claim 12, further comprising a spacer member situated between the capacitor plates, the spacer member including opposite spacer member sides held against an inward facing surface of each capacitor plate along peripheral portions of the air gap whereby the air gap is calibrated along the peripheral portions to the thickness of the spacer member.

15. A method of assembly for a sensor for detecting stress within a material of the sensor type comprising first and second capacitor plates spaced apart by a variably dimensioned air gap, the method comprising the steps:
   a. forming a plurality of through-holes through peripheral portions of each capacitor plate;
   b. positioning a connector block between the capacitor plates, the connector block including a plurality of rod members protruding from opposite connector block sides;
   c. extending the rod members through respective through-holes in the capacitor plates to attach the peripheral portions of each capacitor plate to the connector
   d. forming terminal rod portions of the rod members over an outer side of a respective capacitor plate;
   e. forming the connector block of heat deformable plastics material;
   f. extending the terminal portions of the connector rod members a distance beyond the outer side of a respective capacitor plate; and
   g. applying heat to the terminal portions of the connector rod members while deforming the terminal portions over the outer side of the respective capacitor plate.

16. A method of assembly for a sensor for detecting stress within a material of the sensor type comprising first and second capacitor plates spaced apart by a variably dimensioned air gap, the method comprising the steps:
   a. forming a plurality of through-holes through peripheral portions of each capacitor plate;
   b. positioning a connector block between the capacitor plates, the connector block including a plurality of rod members protruding from opposite connector block sides;
   c. extending the rod members through respective through-holes in the capacitor plates to attach the peripheral portions of each capacitor plate to the connector block; and
   d. forming terminal rod portions of the rod members over an outer side of a respective capacitor plate;
   e. positioning a spacer member between the capacitor plates with opposite spacer member sides against an inward facing surface of the capacitor plates along peripheral portions of the air gap; and
   f. calibrating the air gap along the peripheral portions to the thickness of the spacer member.

* * * * *